US010740137B2

(12) United States Patent
Stephens

(10) Patent No.: US 10,740,137 B2
(45) Date of Patent: *Aug. 11, 2020

(54) INTELLIGENTLY ASSISTED IOT ENDPOINT DEVICE

(71) Applicant: Sanctum Solutions, Inc., Houston, TX (US)

(72) Inventor: Noel Shepard Stephens, Houston, TX (US)

(73) Assignee: Sanctum Solutions, Inc., Houston, TX (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/198,927

(22) Filed: Nov. 23, 2018

(65) Prior Publication Data

US 2019/0196855 A1 Jun. 27, 2019

Related U.S. Application Data

(63) Continuation of application No. 15/434,928, filed on Feb. 16, 2017, now Pat. No. 10,140,147.

(51) Int. Cl.
*G06F 9/455* (2018.01)
*H04W 84/18* (2009.01)
*H04L 29/08* (2006.01)
*H04L 12/26* (2006.01)
*G06F 9/4401* (2018.01)
*H04W 88/04* (2009.01)

(52) U.S. Cl.
CPC ...... *G06F 9/45558* (2013.01); *H04L 43/0811* (2013.01); *H04L 67/10* (2013.01); *H04L 67/12* (2013.01); *H04W 84/18* (2013.01); *G06F 9/4411* (2013.01); *G06F 2009/45579* (2013.01); *G06F 2009/45595* (2013.01); *H04W 88/04* (2013.01); *Y02D 70/00* (2018.01); *Y02D 70/142* (2018.01); *Y02D 70/146* (2018.01); *Y02D 70/164* (2018.01)

(58) Field of Classification Search
CPC .................................................. G06F 9/45533
USPC ............................................................ 718/1
See application file for complete search history.

(56) References Cited

U.S. PATENT DOCUMENTS 7,286,913 B2 * 10/2007 Bodin ................. G05D 1/0044
382/106
7,934,239 B1 * 4/2011 Dagman ........ H04N 21/234336
725/102

(Continued)

*Primary Examiner* — Mehran Kamran
(74) *Attorney, Agent, or Firm* — The Petruzzi Law Firm; James D. Pertruzzi

(57) ABSTRACT

A system having one or more devices connected to a network which redirects data from one or more physical sensors to a network interface, with one or more processors, having an endpoint service executing to receive data collected by the sensor to be sent to the control service, a first virtualized endpoint service associated with the endpoint device executing on the one or more processors including a virtual sensor associated with the first physical sensor causing the element to perform a task that results in a change in the device or device's sensor or the environment surrounding the device, and a first virtual interactive element controller associated with a first interactive element, and a first virtualized endpoint engine, a virtualized endpoint service executing to receive, over the network by the first virtual sensor, first redirected data collected by the physical sensor.

20 Claims, 7 Drawing Sheets

(56) References Cited

U.S. PATENT DOCUMENTS

| | | | | |
|---|---|---|---|---|
| 8,301,318 B2* | 10/2012 | Lacaze | ............... | G05D 1/0206 |
| | | | | 701/1 |
| 8,977,683 B2* | 3/2015 | Rodman | ............ | H04L 12/1813 |
| | | | | 348/14.08 |
| 9,319,300 B2* | 4/2016 | Huynh Van | ......... | H04L 12/4633 |
| 9,503,189 B2* | 11/2016 | Henry | ..................... | H01P 3/10 |
| 2004/0158355 A1* | 8/2004 | Holmqvist | ........... | G05D 1/0236 |
| | | | | 700/245 |
| 2005/0213728 A1* | 9/2005 | Rodman | ................. | H04L 12/66 |
| | | | | 379/202.01 |
| 2005/0213737 A1* | 9/2005 | Rodman | ............ | H04L 12/1813 |
| | | | | 379/202.01 |
| 2008/0016230 A1* | 1/2008 | Holtmanns | ............. | H04L 63/08 |
| | | | | 709/229 |
| 2009/0018712 A1* | 1/2009 | Duncan | ................ | G09B 19/167 |
| | | | | 701/2 |
| 2009/0276105 A1* | 11/2009 | Lacaze | ................ | G05D 1/0044 |
| | | | | 701/2 |
| 2009/0278479 A1* | 11/2009 | Platner | ................ | H05B 47/155 |
| | | | | 315/312 |
| 2010/0008255 A1* | 1/2010 | Khosravy | ............ | H04W 4/026 |
| | | | | 370/254 |
| 2010/0142410 A1* | 6/2010 | Huynh Van | ......... | H04L 12/4633 |
| | | | | 370/255 |
| 2014/0244568 A1* | 8/2014 | Goel | ...................... | H04W 4/08 |
| | | | | 706/52 |
| 2017/0073085 A1* | 3/2017 | Tremblay | ............ | A47G 29/141 |

* cited by examiner

US 10,740,137 B2

INTELLIGENTLY ASSISTED IOT ENDPOINT DEVICE

BACKGROUND

The present disclosure generally relates to processing input/output ("I/O") data from Internet of Things ("IoT") endpoint devices. As microprocessors have become more efficient, and network connectivity more prevalent, an ever increasing portion of goods on the market, both for commercial and consumer retail use, now have internet or intranet enabled capabilities and features. With ever growing capabilities and features, comes an increased demand for processor and memory resources on these IoT endpoint devices. In computer systems, it may be advantageous to scale application deployments by using virtualization in cloud based hosting environments for running application programs. Typically, virtual machines may be quickly launched to scale compute capacity as required by a particular task in virtualized cloud based hosting environments. Virtualization allows a programmer to quickly scale the deployment of applications to the volume of traffic requesting the applications. Virtual machines may be deployed in a variety of hardware environments. There may be economies of scale in deploying hardware in a large scale. To attempt to maximize the usage of computer hardware through parallel processing using virtualization, it may be advantageous to maximize the compute density in a physical hosting environment through virtualization.

SUMMARY

The present disclosure provides a new and innovative system, methods and apparatus for intelligently assisted IoT endpoint devices. In an example, an endpoint device determines that the endpoint device has an active network connection, and based on determining that it has an active network connection, the endpoint device redirects input/output data from a plurality of sensors of the endpoint device including a physical sensor to a network interface. First redirected data collected by the physical sensor is received, over a network by a virtual sensor of a virtualized endpoint service associated with the physical sensor, where the first redirected data is part of the input/output data redirected by the endpoint device. The virtual sensor outputs the first redirected data to a virtualized endpoint engine. The virtualized endpoint engine converts the first redirected data into a first converted data compatible with an endpoint control service then sends the first converted data to the endpoint control service. The virtualized endpoint engine receives a first command from the endpoint control service, and then sends the first command to a virtual interactive element controller associated with an interactive element of the endpoint device. The virtual interactive element controller converts the first command into a second command compatible with the interactive element. The second command is sent over the network causing the interactive element to perform a task. The virtual sensor then receives second redirected data collected by the physical sensor, where the second redirected data is different from the first redirected data as a result of performing the task.

Additional features and advantages of the disclosed method and apparatus are described in, and will be apparent from, the following Detailed Description and the Figures.

DETAILED DESCRIPTION OF EXAMPLE EMBODIMENTS

Figure 1A:
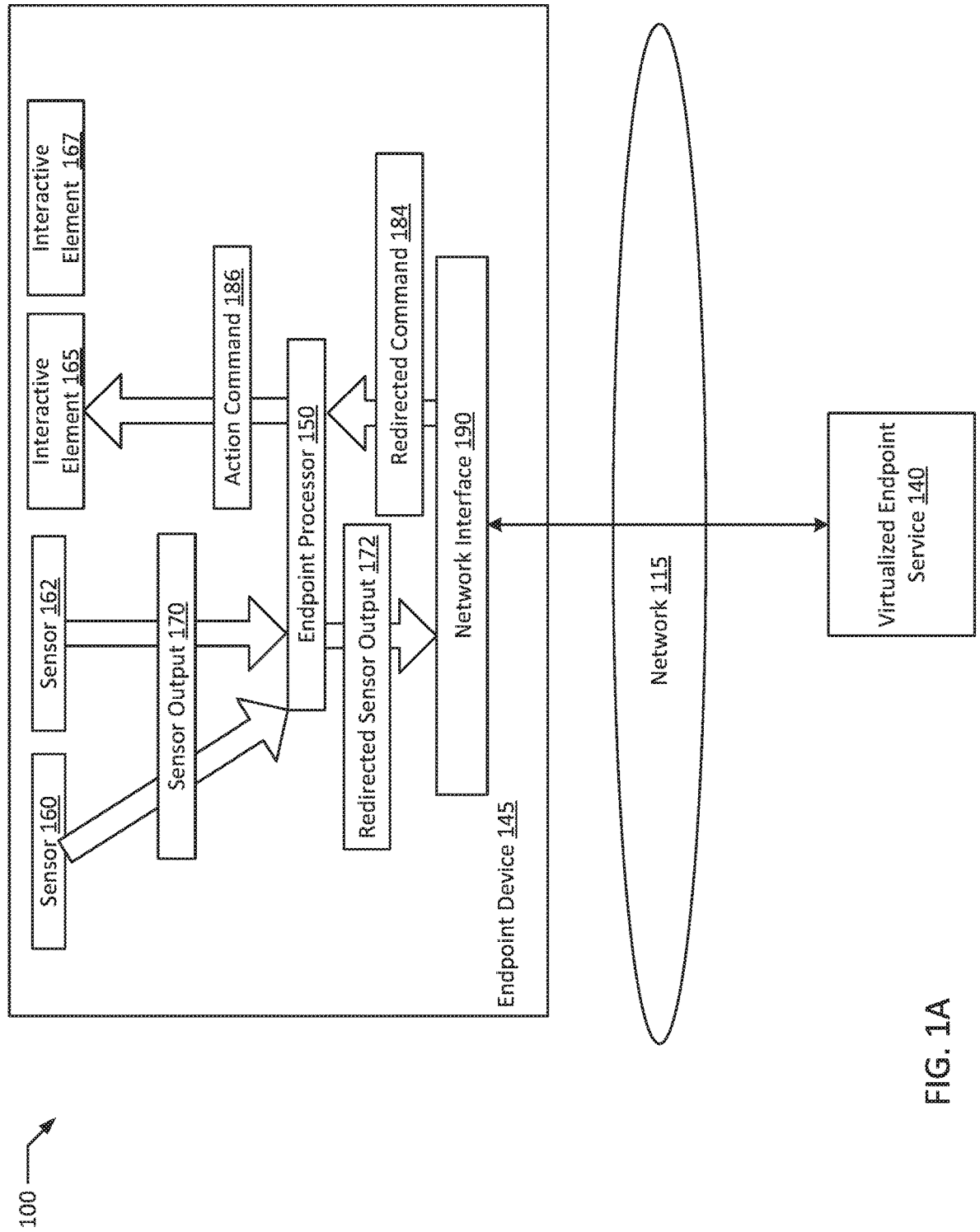
FIGS. 1A and 1B are block diagrams of an intelligently assisted IoT endpoint device system according to an example of the present disclosure.

The concept of connecting sensors that provide feedback over a network related to key operational components of a device is a concept that evolved parallel to the internet. For example, among the earliest uses of networked sensors included monitoring and reporting of the quantity remaining drinks in a vending machine, and the temperature of those drinks, well before personal computers were prevalent. As microprocessor and networking technologies have matured, a logical progression has led to adding computational reporting capabilities to a wide variety of goods. However, with the expansion of the types of devices incorporating network connectivity and onboard intelligence, tradeoffs are typically made between factors such as battery life, hardware cost, size, weight, data security, and other physical constrains placed on a product both from a form factor perspective and from a marketability or profitability perspective.

In an example with a network connected refrigerator, many of the above factors would not be constrains towards placing relatively powerful computing resources onboard, as dedicating a relatively small amount of the internal volume of the refrigerator to computing could, for example, be sufficient for the refrigerator to keep track of expiration dates of food items that are scanned into the refrigerator. Factors like data security are also relatively unimportant, since if a malicious actor already has access to the refrigerator, there are more direct ways to tamper with the food inside than any form of attack on the computing systems of the refrigerator. Power consumption and complexity of computation also tend not to matter since the appliance is served by A/C power and reminders to replace consumed or expired goods do not typically require complex calculations.

Conversely, in an example with a flight capable drone, many similar factors would make the trade offs required in product design much more difficult. In a drone, space and weight tend to be at a premium, as the larger and heavier the drone, the more power is required to keep it afloat, and the more power that is consumed operating non-flight components, the shorter the flight range of the drone. A drone may also be relatively densely packed with sensors of varying types, both for flight maintenance (e.g., altimeters, gyroscopes, speedometers etc.) as well as for operational tasks such as surveillance (e.g., cameras, microphones, radar, lidar etc.) or meteorology (e.g., barometers, moisture meters, thermometers, anemometers etc.). The processing capabilities required to handle input/output ("I/O") data from all of these various sources may well exceed the capabilities of an economically feasible computing solution for a small form factor drone. In terms of security, it is much more likely in the case of a drone than in the case of a refrigerator that a malicious actor may gain access to a user's drone without having access to the user's person or home.

Virtualization allows computer systems to be quickly scaled to meet the processing demands of the moment, without paying for or wasting excess capacity that may not be needed. Typically, a multi-tenant cloud provider hosts many applications on many virtual machines belonging to many different tenants. Virtualization through the use of isolated guests such as virtual machines ("VMs") or containers may allow a programmer to quickly scale the deployment of applications to the volume of traffic requesting the applications. VMs may be deployed in a variety of hardware environments. There may be economies of scale in deploying hardware in a large scale. A cloud provider may rent or sell excess computing capacity on extra hardware deployed to, for example, achieve per unit cost savings on hardware, or for the express purpose of creating a revenue stream from such rentals. A programmer may hire one or more cloud providers to provide contingent space for situations where the programmer's applications may require extra compute capacity, becoming a tenant of the cloud provider. A tenant may flexibly launch more or less copies of virtual machines and more or less copies of applications in response to the ebb and flow of traffic. The cloud provider may be unaware of the specific contents of the traffic, for example, due to contractual privacy terms or encryption.

The present disclosure aims to address the design challenges for finding an optimal compute capacity for IoT endpoint devices by leveraging the scalability of cloud computing to enable intelligently assisted IoT endpoint devices. In an example, an IoT endpoint device may be configured such that a virtual endpoint service in a cloud environment is directly associated with the endpoint device. The virtual endpoint service may be configured to include virtual I/O components associated with a plurality of the physical I/O components (e.g., sensors or actuators) on the IoT endpoint device. By redirecting the output of physical sensors from the IoT endpoint device to corresponding virtual sensors in the virtualized endpoint service, the computing resources and scalability of the cloud may be leveraged to process the data feeds, with only specific instructions to specific interactive elements of the IoT endpoint device receiving instructions based on the processed results from the sensor feeds. In an example, the increased compute capabilities may be directly leveraged by existing control software for the IoT endpoint device where feeds from virtual and physical sensors are indistinguishable to control software executing on the virtualized endpoint service. In addition, in examples where sensor feeds are redirected by default, physical access to a disabled device would not pose any significant security risk related to any contents stored on the device since sensor data will have been redirected and would not be available even in a raw form on the device itself.

Figure 1B:
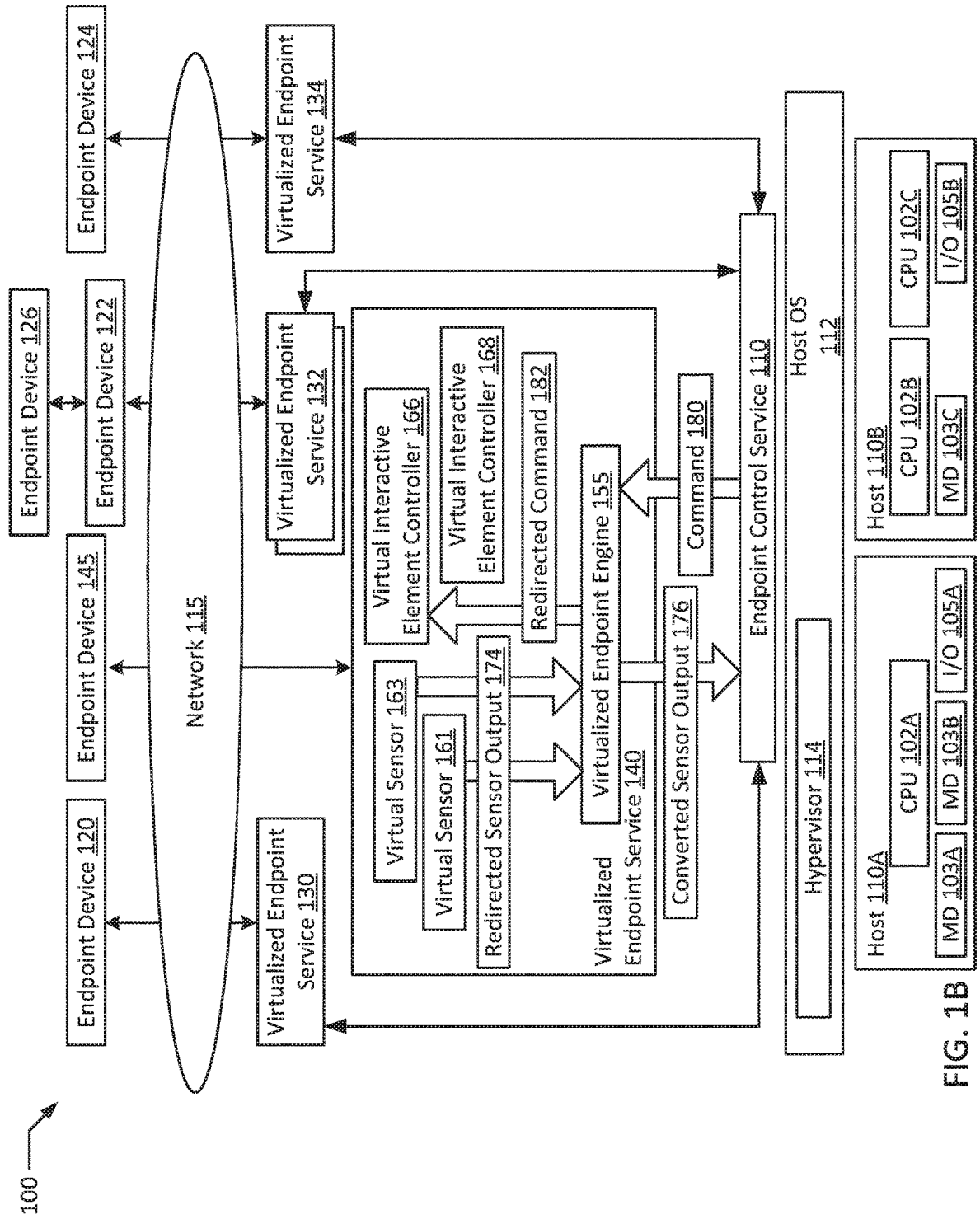

FIGS. 1A and 1B are block diagrams of an intelligently assisted IoT endpoint device system according to an example of the present disclosure. In an example, endpoint device 145 is an IoT endpoint device and virtualized endpoint service 140 is a virtual representation of endpoint device 145. In the example, endpoint device 145 may be connected to network 115 and therefore to virtualized endpoint service 140 over a wireless connection. In an example, virtualized endpoint service 140 may execute on a VM inside of a local area network connected to network 115. As illustrated in FIG. 1B, the system 100 may include one or more interconnected hosts (e.g., hosts 110A-B). Each host 110A-B may in turn include one or more physical processors (e.g., CPU 102A-C) communicatively coupled to memory devices (e.g., MD 103A-C) and input/output devices (e.g., I/O 105A-B). As used herein, physical processor or processors (Central Processing Units "CPUs") 102A-C refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 103A-C refers to a volatile or non-volatile memory device, such as RAM, ROM, EEPROM, or any other device capable of storing data. As discussed herein, I/O device 105A-B refers to a device capable of providing an interface between one or more processor pins and an external device, the operation of which is based on the processor inputting and/or outputting binary data. CPUs 102A-C may be interconnected using a variety of techniques, ranging from a point-to-point processor interconnect, to a system area network, such as an Ethernet-based network. Local connections within each host 110A-B, including the connections between a processor 102A and a memory device 103A-B and between a processor 102A and an I/O device 105A may be provided by one or more local buses of suitable architecture, for example, peripheral component interconnect (PCI).

In computer systems (e.g., system 100), it may be advantageous to scale application deployments by using isolated guests such as virtual machines and containers that may be used for creating hosting environments for running application programs. Typically, isolated guests such as containers and virtual machines may be launched to provide extra compute capacity of a type that the isolated guest is designed to provide. Isolated guests allow a programmer to quickly scale the deployment of applications to the volume of traffic requesting the applications as well as isolate other parts of system 100 from potential harmful code executing within any one virtual machine. In an example, a VM may be a robust simulation of an actual physical computer system utilizing a hypervisor or a component (e.g., a virtual machine manager) that executes tasks commonly executed by hypervisors to allocate physical resources to the virtual machine. In an example, each of virtualized endpoint services 130, 132, 134, and 140 may execute on one or more VMs. In some examples, each virtualized endpoint service executes on a dedicated VM. In an example, endpoint control service 110 executes on at least one VM, and the number of VMs endpoint control service 110 executes on scales based on the processing needs of endpoint control service 110. In an example, virtualized endpoint services 130, 132, 134, and 140 may execute on containers. In another example, subcomponents of virtualized endpoint service 140 (e.g., virtual sensors 161 and 163, virtual interactive element controllers 166 and 168, and virtualized endpoint engine 155) may execute on containers on a VM executing virtualized endpoint service 140. In an example, various components of endpoint control service 110 may execute on containers, and the quantity of containers executing as any particular component may be scaled dynamically.

In an example, containers executing various components of endpoint control service 110 may be organized into microservices.

In an example, hosts 110A-B may run one or more isolated guests in the form of VMs hosting virtualized endpoint services 130, 132, 134, 140 and endpoint control service 110, by executing a software layer (e.g., hypervisor 114) above the hardware and below the VMs, as schematically shown in FIG. 1B. In an example, the hypervisor 114 may be components of the host operating system 112 executed by the system 100. In another example, the hypervisor 114 may be provided by an application running on host operating system 112, or may run directly on the hosts 110A-B without an operating system beneath it. The hypervisor 114 may virtualize the physical layer, including processors, memory, and I/O devices, and present this virtualization to the VMs hosting virtualized endpoint services 130, 132, 134, 140 and endpoint control service 110 as devices, including virtual processors ("VCPUs"), virtual memory devices ("VMDs"), virtual I/O devices ("VI/Os"), and/or guest memory. In an example, a virtualized endpoint service 140 may be hosted a virtual machine and may execute a guest operating system ("OS") which may utilize the underlying virtual central processing unit, virtual memory device, and virtual input/output devices (e.g., virtual sensors 161 and 163, and virtual interactive element controllers 166 and 168). Processor virtualization may be implemented by the hypervisor 114 scheduling time slots on one or more physical processors 102A-C such that from the guest operating system's perspective those time slots are scheduled on a virtual processor.

A VM hosting virtualized endpoint service 140 may run on any type of dependent, independent, compatible, and/or incompatible applications on the underlying hardware and host operating system 112. In an example, a guest OS and applications (e.g., virtualized endpoint engine 155, virtual sensors 161 and 163, and virtual interactive element controllers 166 and 168) running on the VM hosting virtualized endpoint service 140 may be independent of the underlying hardware and/or host operating system 112. Additionally, any guest OS and applications (e.g., virtualized endpoint engine 155, virtual sensors 161 and 163, and virtual interactive element controllers 166 and 168) may be incompatible with the underlying hardware and/or host operating system 112. The hypervisor 114 manages memory for the host operating system 112 as well as memory allocated to the VM and guest operating system the VM hosting virtualized endpoint service 140. In an example, the VMs hosting virtualized endpoint services 130, 132, and 134 may be other virtual machine similar in configuration to the VM hosting virtualized endpoint service 140. In some examples, various components of system 100, for example, host 110A and host 110B may reside over a network from each other, which may be, for example, a public network (e.g., the Internet), a private network (e.g., a local area network (LAN) or wide area network (WAN)), or a combination thereof.

In an example, each virtualized endpoint service (e.g., virtualized endpoint services 130, 132, 134, and 140) are associated with a respective endpoint device (e.g., endpoint devices 120, 122, 124, 126, and 145). In some examples, each virtualized endpoint service is uniquely associated with an endpoint device (e.g., virtualized endpoint service 130 with endpoint device 120, virtualized endpoint service 132 with endpoint device 122, virtualized endpoint service 134 with endpoint device 124, and virtualized endpoint service 140 with endpoint device 145). In some examples, an endpoint device (e.g., endpoint device 126) may lack a direct connection to network 115 and may connect to network 115 through another endpoint device (e.g., endpoint device 122). In some examples, endpoint device 126 may have its own virtualized endpoint service. In an example, virtualized endpoint service 132 may host a second virtualized endpoint service within virtualized endpoint service 132 to be associated with endpoint device 126. In another example, virtualized endpoint service 132 may additionally redirect I/O data to and from endpoint device 126 to another VM hosting another virtualized endpoint service. In an example, network 115 may be a public network (e.g., the Internet), a private network (e.g., a local area network (LAN) or wide area network (WAN)), or a combination thereof. In an example, virtualized endpoint services 130, 132, 134, and 140, endpoint control service 110, host OS 112, hypervisor 114, and hosts 110A-B may all be in the same cloud, which may be a public or a private cloud. In an example, communications between each of virtualized endpoint services 130, 132, 134, and 140, endpoint control service 110, host OS 112, hypervisor 114, and hosts 110A-B may be secured (e.g., by encryption and/or obfuscation) against other members of the cloud and/or the public at large. In some examples, one or more of virtualized endpoint services 130, 132, 134, and 140, endpoint control service 110 may be hosted on forms of virtualization other than full virtual machines. For example, virtualized endpoint services 130, 132, 134, and 140, endpoint control service 110 may be hosted on containers.

In an example, each endpoint device (e.g., endpoint devices 120, 122, 124, 126, and 145) may include a variety of components. For example as illustrated in FIG. 1A, endpoint device 145 may include a plurality of sensors (e.g., sensors 160 and 162), a plurality of interactive elements (e.g., interactive elements 165 and 167), one or more processors (e.g., endpoint processor 150), and a network interface 190. In an example, sensors 160 and 162 may be any type of device that allows endpoint device 145 to make measurements (e.g., a camera, a microphone, an accelerometer, an antenna, a battery life sensor, a compass, a Global Positioning System® ("GPS") sensor, a gyroscope, and a radio). In an example, interactive elements are components of an endpoint device capable of producing a physical manipulation of an endpoint device or its surroundings. For example, interactive elements 165 and 167 may be actuators that control a physical sensor (e.g., sensors 160 and 162) thereby changing the measurements received from that sensor (e.g., altering an orientation, a focus or a mode of the sensor). In an example, endpoint device 145 may be a robotic vehicle, a drone or a robotic device that is mobile. In such an example, interactive elements 165 and 167 may be components granting endpoint device 145 mobility (e.g., a propeller, a wheel, a tread track, a motor, a jet engine, a magnetic levitation system, a gyroscope stabilizer, a braking system, and a steering system). In an example, endpoint device 145 is associated with a virtualized endpoint service 140, and virtualized endpoint service 140 is dedicated to endpoint device 145. In an example, each interactive element (e.g., interactive elements 165 and 167) in endpoint device 145 is associated with a respective virtual interactive element controller (e.g., virtual interactive element controllers 166 and 168) in virtualized endpoint service 140. In an example, each interactive element is associated with a dedicated virtual interactive element controller (e.g., interactive element 165 with virtual interactive element controller 166, and interactive element 167 with virtual interactive element controller 168). In some examples, one virtual interactive element controller may be associated with and control multiple similar interactive elements (e.g., one interactive element controller to control the rotational speed of all four wheels in a robotic vehicle rather than a separate interactive element controller for each wheel).

As illustrated in FIG. 1A, endpoint device 145 may be communicatively coupled with virtualized endpoint service 140 through network 115. In an example, network 115 may include one or more transmissions, and may include both wired and wireless communications and any combination thereof. In an example, sensor output 170 is raw sensor data collected by sensors 160 and 162, which may be redirected by endpoint processor 150 as redirected sensor output 172 to network interface 190 for transmission to virtualized endpoint service 140. In an example, redirected command 184 is a command to interactive elements 165 and/or 167 by virtual interactive element controllers 166 and/or 168. In an example, endpoint processor 150 receives redirected command 184 and issues an action command 186 to interactive element 165. In an example redirected command 184 may be in a similar form to an instruction endpoint processor 150 may receive from an onboard controller for interactive element 165. In the example, action command 186 may be in a form that is compatible with interactive element 165, and may result from a reinterpretation of redirected command 184. In another example, action command 186 may be an unchanged version of redirected command 184, where endpoint processor 150 routes messages to ensure that the proper interactive element (e.g., interactive element 165) receives redirected command 184.

In an example as shown in FIGS. 1A and 1B, sensor 160 may be associated with virtual sensor 161, and sensor 162 may be associated with virtual sensor 163. In the example, redirected sensor output 172 is received by virtualized endpoint service 140, where the portion of redirected sensor output 172 that corresponds to sensor 160 may be received by virtual sensor 161, and the portion of redirected sensor output 172 that corresponds to sensor 162 may be received by virtual sensor 163. In an example, virtual sensors 161 and 163 may then output the data received in redirected sensor output 172 as redirected sensor output 174 to virtualized endpoint engine 155. In an example, virtualized endpoint engine 155 may interpret virtual sensors 161 and 163 to be physical sensors 160 and 162. In an example, virtualized endpoint engine 155 may convert redirected sensor output 174 to converted sensor output 176, where the conversion process includes interpreting raw data from redirected sensor output 174 into a form consumable by endpoint control service 110. In an example, endpoint control service 110 issues a command 180 based on converted sensor output 176; with command 180 being redirected by virtualized endpoint engine 155 as redirected command 182 to virtual interactive element controller 166. In an example, virtual interactive element controller 166 may reinterpret redirected command 182 into a format compatible with endpoint processor 150 before transmitting the reinterpreted redirected command 182 as redirected command 184. In an example, redirected command 182 may be in general form, (e.g., move forward), while redirected command 184 may be more specific instructions (e.g., spin wheels at 1000 revolutions per minute for 2 seconds).

In an example, virtualized endpoint service 140 may be a complete virtual representation of each component of endpoint device 145 capable of generating electronic output data or receiving electronic input data. In the example control software that may control endpoint device 145 directly, may execute on virtualized endpoint service 140 and control endpoint device 145 indirectly with little to no modifications. In an example, virtualized endpoint service 140 may appear to the control software as if virtualized endpoint service 140 was in fact endpoint device 145. In the example, various components (e.g., virtual interactive element controllers 166 and 168) of virtualized endpoint service 140, rather than executing instructions from the control software directly, may instead seamlessly pass those instructions onto corresponding physical components in endpoint device 145 (e.g., interactive elements 165 and 167).

Figure 2:
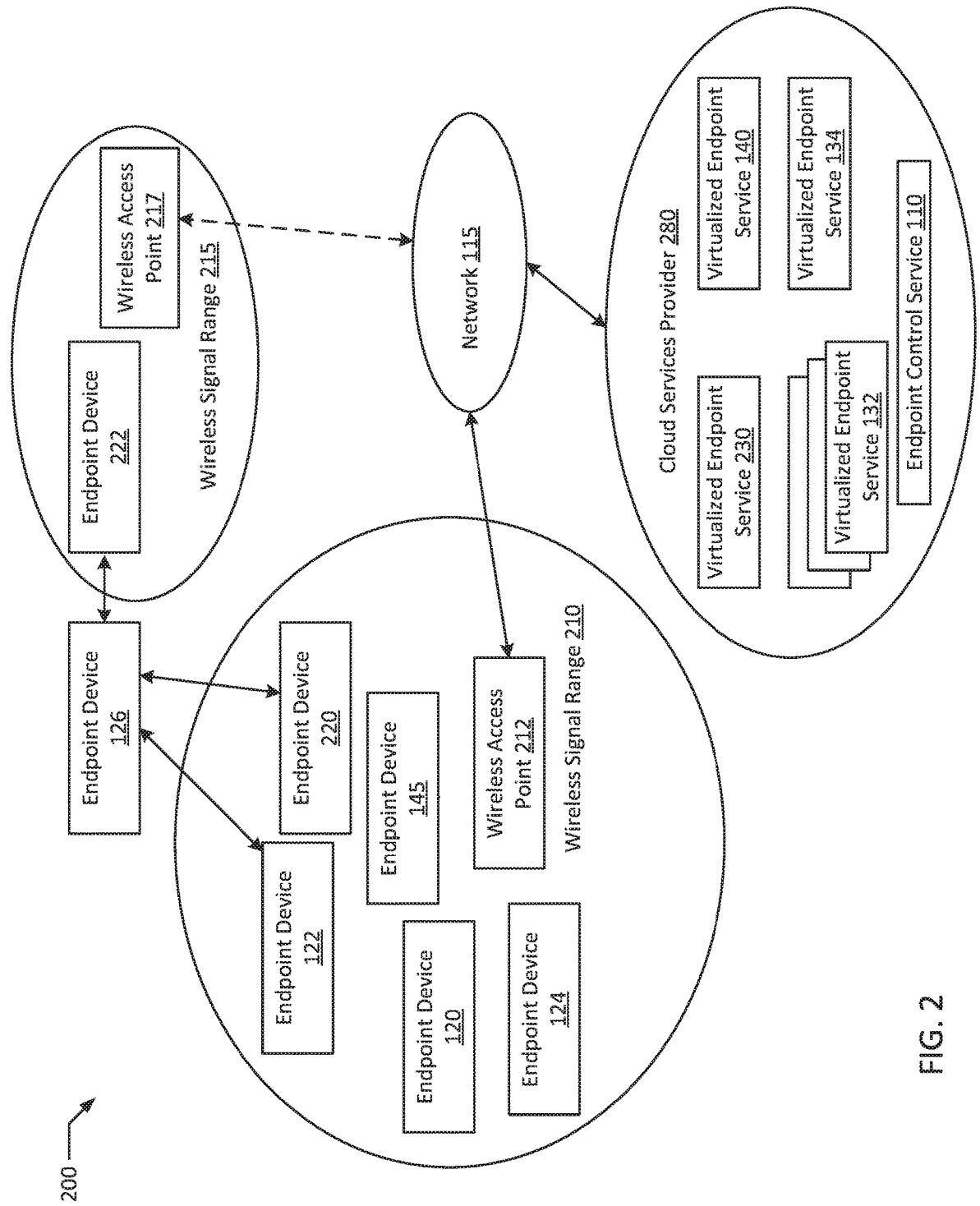
FIG. 2 is a block diagram of connectivity redundancy for intelligently assisted IoT endpoint devices according to an example of the present disclosure.

FIG. 2 is a block diagram of connectivity redundancy for intelligently assisted IoT endpoint devices according to an example of the present disclosure. System 200 may be a broader system including system 100 illustrating networking components (e.g., wireless access points 212 and 217, and wireless signal ranges 210 and 215) that allow various endpoint devices (e.g., endpoint devices 120, 122, 124, 126, 145, 212, 220, and 222) to connect to their respectively associated virtualized endpoint services (e.g., virtualized endpoint services 132, 134, 140, and 230). In an example, intelligently assisted IoT endpoint devices may be heavily reliant on active network connectivity to advantageously benefit from the computing power of the endpoint control service 110. In an example, virtualized endpoint services 130, 132, 134, 140, 230, etc., along with endpoint control service 110 may reside within a local area network provided by cloud services provider 280. In the example, a gateway for cloud services provider 280 allows the virtualized endpoint services to access network 115. In an example, wireless access points 212 and 217 are additional gateways connected to network 115. For example, wireless access points 212 and 217 may be any form of wireless gateway (e.g., WiFi, wiMAX, cellular data, and radio). In an example, wireless access point 212 has a wireless signal range 210, and wireless access point 217 has a wireless signal range 215. In an example, wireless signal range 210 and wireless signal range 215 may or may not overlap with each other. In an example, endpoint devices 120, 122, 124, 145, 212, and 220 are physically within wireless signal range 210, and endpoint device 222 is physically within wireless signal range 215. In an example, endpoint device 126 is not physically within either wireless signal range 210 or wireless signal range 215. In the example, endpoint device 126 may connect to another endpoint device (e.g., endpoint device 122, 220, or 222) if endpoint device 126 is within wireless transmission range of any one of endpoint devices 122, 220 or 222. In an example, endpoint device 126 may connect to endpoint devices 122, 220 and/or 222 through any connection type, wired or wireless (e.g., personal area networking, local area networking, metropolitan area networking or wide area networking). In an example, endpoint device 126 may use an onboard radio to connect to endpoint devices 122, 220 and/or 222. In an example, by connecting to endpoint devices 122, 220 and/or 222, endpoint device 126 may connect to network 115 indirectly even though endpoint device 126 is not physically within the wireless signal ranges 210 or 215. In an example, endpoint device 126 may connect to more than one of endpoint devices 122, 220 and/or 222 for redundancy, reliability, and/or security. In an example, endpoint device 126 may have an active network connection to its associated virtualized endpoint service (e.g., virtualized endpoint service 230) by connecting through endpoint devices 122, 220, and/or 222. In an example, endpoint devices 122, 220 and/or 222 may act as a relay for endpoint device 126 by forwarding network transmission packets between endpoint device 126 and virtualized endpoint service 230 without any modification to the data included in the network transmission packets. In an example, virtualized endpoint service 230 may connect directly to endpoint devices 122, 220 or 222. In another example, virtualized endpoint service 230 may connect to endpoint devices 122, 220 and/or 222 through a virtualized endpoint service respectively associated with endpoint devices 122, 220 and/or 222 (e.g., virtualized endpoint service 132 associated with endpoint device 122). In an example, endpoint device 126 may be connected to network 115 through multiple indirect connections through multiple other endpoint devices so long as at least one of the endpoint devices is physically within a wireless signal range (e.g., wireless signal range 210 and 215) of a wireless access point (e.g., wireless access point 212 and 217) connected to network 115.

Figure 3:
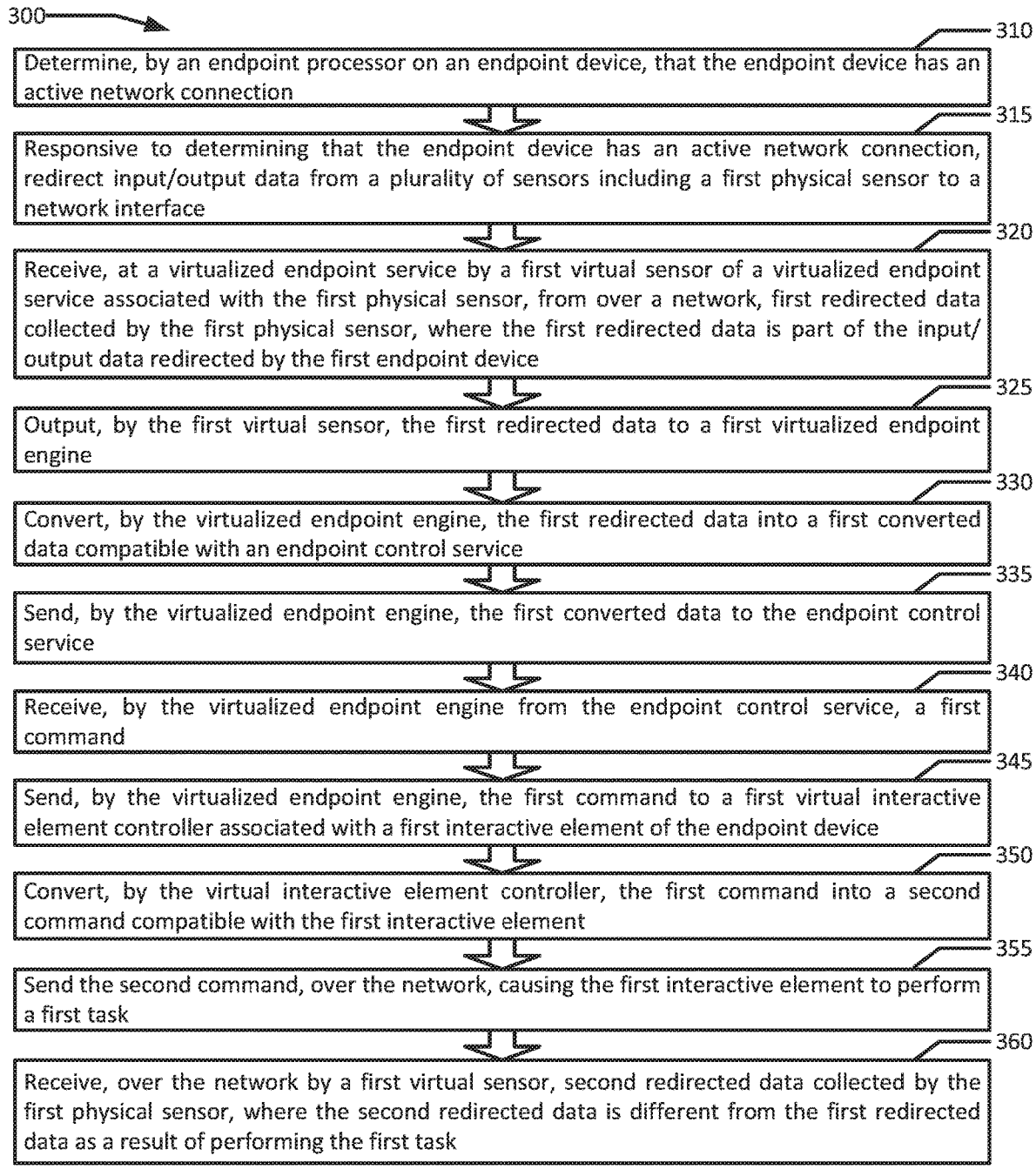
FIG. 3 is a flowchart illustrating an example of intelligently assisting an IoT endpoint device system according to an example of the present disclosure.

FIG. 3 is a flowchart illustrating an example of intelligently assisting an IoT endpoint device system according to an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both. In an example, the method is performed by a virtualized endpoint service 140 in communication with an endpoint device 145.

The example method 300 may begin with an endpoint processor on an endpoint device determining that the endpoint device has an active network connection (block 310). In an example, endpoint device 145 may determine that it has an active network connection to network 115. For example, endpoint device 145 may attempt to access virtualized endpoint service 140 through communications protocols loaded to endpoint device 145 during an initialization process. In an example, endpoint device 145 may employ specialized encryption and/or obfuscation on its network traffic to and from virtualized endpoint service 140, including any required authentication protocols. In an example, endpoint device 145 may be a flying drone with a camera sensor 160.

In an example, responsive to determining that the endpoint device has an active network connection, input/output data from a plurality of sensors of the endpoint device including a first physical sensor are redirected to a network interface (block 315). For example, endpoint device 145 may attempt to establish a secure communication session with virtualized endpoint service 140 over network 115. Upon confirmation that the secure communication session has been established, endpoint device 145 may begin to redirect input/output data (e.g., sensor output 170) collected by sensors 160 and 162 to network interface 190. In an example, endpoint processor 150 makes the determination to begin redirection of I/O data. In an example, endpoint processor 150 redirects raw data from sensors 160 and 162 (e.g., a binary data stream) to network interface 190 without further interpretation.

The example method 300 may then continue with a first virtual sensor of the virtualized endpoint receiving first redirected data collected by the first physical sensor over a network, where the first virtual sensor is associated with the first physical sensor, and the first redirected data is part of the input/output data redirected by the first endpoint device (block 320). In an example, part of sensor output 170 is the sensor output of sensor 160. In the example, virtual sensor 161 receives the part of sensor output 170 originating from sensor 160 over network 115. In an example, virtual sensor 161 is a dedicated receiving point for sensor data from sensor 160, which is a physical sensor on endpoint device 145. In an example, network interface 190 may encrypt and/or obfuscate data before transmitting the data to virtualized endpoint service 140. In an example, virtual sensor 161 may include all of the I/O states of physical sensor 160, and may serve as a surrogate for all I/O processing directed towards physical sensor 160. In an example, virtual sensor 161 may be indistinguishable from physical sensor 160 to a virtualized endpoint engine 155.

In an example, the first virtual sensor outputs the first redirected data to a first virtualized endpoint engine (block 325). For example, virtual sensor 160 may output redirected sensor output 174 to virtualized endpoint engine 155. In the example, redirected sensor output 174 may be the same data as sensor output 170. In the example, virtualized endpoint service 140 may have removed all of the modifications performed on the data stream of sensor output 170 to prepare the data for network transmission (e.g., packetizing, encrypting, and obfuscating). In an example, part of redirected sensor output 172 may have been flagged with virtual sensor 161 as a destination. In an example, for programming purposes, virtualized endpoint engine 155 may interact with virtual sensor 161 as if virtual sensor 161 were physical sensor 160, and any messages sent between virtual sensor 161 and virtualized endpoint engine 155 are seamlessly forwarded between virtual sensor 161 and physical sensor 160. In an example, virtual sensor 161 may appear to be physical sensor 160 to virtualized endpoint engine 155.

In an example, the virtualized endpoint engine converts the first redirected data into a first converted data compatible with an endpoint control service (block 330). For example, virtualized endpoint engine 155 may receive redirected sensor output 174, and convert redirected sensor output 174 into converted sensor output 176. In an example, redirected sensor output 174 may be a stream of bits from a camera sensor 160, while converted sensor output 176 may be an encoded video file of the same data. In an example, after the conversion process, the virtualized endpoint engine sends the first converted data to the endpoint control service (block 335). For example, virtualized endpoint engine 155 may send converted sensor output 176 to endpoint control service 110.

Endpoint control service 110 may be any system or combination of systems performing the functionality of an endpoint control service. In an example, endpoint control service 110 provides the processing capabilities to parse incoming data in the form of converted sensor output 176. In an example, endpoint control service 110 may be able to provide vastly superior data processing capabilities compared to an onboard processor. For example, a fully autonomous drone with an onboard navigation and autopilot suite may be cost prohibitive from a computing standpoint, or may have its effective range or payload cut to an unacceptable extent by extra size and weight for batteries and processor equipment. In such an example, a potential trade-off may be a diminished capability to operate in inclement weather. A similar drone operating as an intelligently assisted IoT endpoint device may, however, require even less processing power onboard (as the endpoint processor is only required to package data for network transmission and to route response commands to the proper interactive elements). The intelligently assisted drone, may be able to take off and fly in significantly worse weather because the endpoint control service may be able to process many more data points from various sensors to keep the drone afloat. Similarly, the endpoint control service may have other data sources that may be used to better calculate an optimal course of action, for example, weather reports may be incorporated to find more optimal routes. In an example, an endpoint control service may also factor in sensor input from other endpoint devices in close proximity (e.g., sensor data from another drone that shows clear skies at a slightly higher altitude).

In some examples, endpoint control service 110 may further record some of converted sensor output 176. In an example where endpoint device 145 is a surveillance drone, for example, part of a security system patrolling a home or corporate property, the video feed from a camera sensor 160 may be stored after being converted to a standard video file by virtualized endpoint engine 155. In an example, sensor 162 may be a GPS location sensor, periodic location information resulting from sensor 162 may also be stored after being processed by virtualized endpoint engine 155. In an example, a drone with little onboard intelligence and minimal onboard storage may be preferred for tasks where losing the drone with data onboard may be problematic. For example, if a drone were to record video of its flight path onboard, a malicious actor who intercepts the drone may be able to discern a route that is no longer covered by drone surveillance based on stored video of the drone's flight path if the video storage was onboard. In an example, a drone whose surveillance footage requires downloading from onboard storage may have its purpose defeated if the drone were to be tampered with in flight, as the data including the tamperer's identity may well be lost. In another example, if a drone were being used to deliver packages, it would be disadvantageous for someone who finds a disabled drone to be able to find the location and types of packages previously delivered by the drone by accessing internal memory. Likewise, for an IoT endpoint device like a driverless automobile, it may well be disadvantageous from a security standpoint if the onboard storage and guidance systems included too much data regarding a user's typical travels. For example, in the case of a vehicle stolen from an airport parking lot, such information may indicate the owner's residence and divulge that the owner is away from home. In some examples, an owner may want ownership information for their endpoint device labeled on the endpoint device in case the endpoint device becomes lost. However, in many situations, an owner may not want to divulge personal information such as an address, and may rather have the non-transitory storage for the endpoint device reside in the cloud rather than on the endpoint device.

The virtualized endpoint engine may receive a first command from the endpoint control service (block 340). In an example, endpoint control service 110 may process the converted sensor output 176, and based at least in part on the data received in converted sensor output 176, the endpoint control service 110 may generate a command 180. In an example, endpoint control service 110 may be a specialized controller for a particular type of endpoint device. In another example, endpoint control service 110 may be a combination of various modules each responsible for specific types of converted sensor outputs. For example, endpoint control service 110 may include application programming interfaces ("APIs") for controlling a variety of different types of I/O data. In an example, endpoint control service 110 may receive configuration settings from these APIs. For example, endpoint control service 110 may process visual inputs (e.g., from a camera sensor 160). In the example, endpoint control service 110 may include components specific to the type of camera sensor of camera sensor 160. In the example, endpoint control service 110 may also include a visual API for configuring visual input settings. In some examples, the visual API may be a generic visual API capable of interfacing with a variety of type specific camera sensor interface components. In an example, endpoint control service 110 may determine that a closer view of a target object is required. In an example, endpoint control service may issue a command to zoom in camera sensor 160. In such an example, the interactive element responding to a command may actually be a component part of the sensor (e.g., camera sensor 160) whose data feed has been redirected. In another example, endpoint control service may issue a command for endpoint device 140 to move closer to the target. In various examples, endpoint control service 110 may include a variety of modules based on expected redirected data types from endpoint device 140, including visual, audio, and navigational data types. In an example, endpoint control service 110 may also include visual, audio and navigational APIs. In some examples, endpoint control service 110 may integrate data from a plurality of endpoint devices (e.g., constructing a three dimensional representation of a target object by merging visual data from multiple camera sensors on multiple endpoint devices). In some examples, the endpoint control service may issue an additional command to a second endpoint device (e.g., based on sensor data from the first endpoint device (e.g., endpoint device 145).

In an example, each virtualized endpoint service (e.g., virtualized endpoint services 130, 132, 134, 140, and 220) may be associated with a separate API. In an example, endpoint devices of the same type may be controlled with copies of the same API. For example, one copy of the API acts as an interface to control virtualized endpoint service 130, and a second copy of the API acts as an interface to control virtualized endpoint service 140. In an example, a user interface may be constructed interfacing with various copies of the API as required to provide a user interface capable of controlling multiple endpoint devices. For example, a user interface for surveillance drone endpoint devices may interface with a first copy of the API to control a first drone and a second copy of the API to control a second drone. In the example, the user interface may allow an operator to take direct control of the drone through the endpoint control service 110. In an example, one copy of the API may control multiple endpoint devices (e.g., where the API is associated with endpoint control service 110). In an example, the API may be an interface to the endpoint control service 110, which may in turn process data streams and actions for multiple endpoint devices of the same or different types working in concert.

The virtualized endpoint engine may send the first command to a first virtual interactive element controller associated with a first interactive element of the endpoint device (block 345). In an example, an endpoint device may have one or more interactive elements that may effect a change to the endpoint device or the endpoint device's surroundings. In an example, interactive element 165 may be a component related to the mobility of endpoint device 145. In such an example, virtualized endpoint engine 155 may relay a command 180 as redirected command 182 to a virtual interactive element controller 166. In an example, virtual interactive element controllers 166 and 168 may each be responsible for interpreting commands from endpoint control service 110 for an interactive element in endpoint device 145. For example, command 180, and redirected command 182 may both be in a generic form (e.g., increase altitude to thirty meters). In the example, virtual interactive element controller 166 may process the generic redirected command 182 into specific instructions (e.g., rotate faster) to a propeller (e.g., interactive element 165) in endpoint device 145. In the example virtual interactive element controller 166 may be a virtual representation of interactive element 165. For example, virtualized endpoint engine 155 may believe it is sending a command to a physical interactive element (e.g., interactive element 165) when virtualized endpoint engine 155 sends redirected command 182 to virtual interactive element controller 166. In an example, the amount of reinterpretation required of virtual interactive element controller 166 depends on the specificity and compatibility of the command 180 issued by endpoint control service 110 with interactive element 165. In an example, command 180 may be identical to redirected command 182, with virtualized endpoint engine 155 solely responsible for routing command 180 to the proper virtual interactive element controller without modification to command 180.

In an example, the virtual interactive element controller converts the first command into a second command compatible with the first interactive element (block 350). For example, virtual interactive element controller 166 may convert command 180 and/or redirected command 182 into a form compatible with interactive element 165. In an example, virtual interactive element controller 166 may convert redirected command 182 into redirected command 184, where redirected command 184 includes more specific implementation instructions than redirected command 182. For example, redirected command 184 may indicate "increase altitude to thirty meters" while redirected command 184 may indicate "increase rotation speed of a propeller to 2000 revolutions per minute and then decrease rotation speed to 1000 revolutions per minute after an altimeter reading of twenty-eight meters is reached." In some examples (e.g., where endpoint control service 110 lacks a specific interface for endpoint device 145), more interpretation of commands from endpoint control service 110 may be necessary by virtual interactive element controller 166. In other examples (e.g., where endpoint control service 110 includes components for specifically outputting commands and/or instructions for endpoint device 145 and/or interactive element 165), virtual interactive element controller 166 may need to perform little or even no conversion to the contents of commands (e.g., command 180) from endpoint control service 110. In some examples, endpoint control service 110 may directly output a binary bit stream of instructions compatible with interactive element 165. In such examples, virtual interactive element controller 166 may serve as a surrogate for receiving the binary bit stream instructions intended for interactive element 165, and virtual interactive element controller 166 may convert the bit stream instructions into a format that may be transmitted over network 115. For example, virtual interactive element controller 166 may packetize command 180 into individual command messages that may then be transmitted with Internet Protocol ("IP"), Transmission Control Protocol ("TCP"), User Datagram Protocol ("UDP") or any other networking protocol.

The virtualized endpoint service may send the second command over the network causing the first interactive element to perform a first task (block 355). For example, virtualized endpoint service 140 may send a version of command 180 or redirected command 182 that has been converted by virtual interactive element controller 166 into a format compatible with interactive element 165 to endpoint device 145. For example, the output from virtual interactive element controller 166 may be redirected command 184, which may be received by network interface 190 on endpoint device 145. In an example, redirected command 184 may be routed by endpoint processor 150 to interactive element 165 in the form of action command 186. In various examples, endpoint processor 150 may perform varying degrees of processing on redirected command 184. Where endpoint control service 110 has a specific integration with interactive elements of the same type as interactive element 165, endpoint processor 150 may simply need to route redirected command 184 to interactive element 165 with no changes to the contents of the command. In an example, endpoint processor 150 may be capable of processing sensor data (e.g., sensor output 170) into action commands (e.g., action command 186) without redirection through network interface 190 when no network connection is available. In an example, endpoint processor 150 may be constrained with regards to the complexity of the processing of sensor output or action commands (e.g., being limited to continuing the last directive received from a virtualized endpoint service and/or entering a failsafe mode). In an example, the first task may be to take a closer picture of a target, which may be achieved in multiple ways. For example, command 180 may instruct endpoint device 145 to move closer to the target, or command 180 may instruct endpoint device 145 to zoom in with camera sensor 160.

In an example, the first virtual sensor receives second redirected data collected by the first physical sensor over the network, where the second redirected data is different from the first redirected data as a result of performing the first task (block 360). In an example, performing the first task (e.g., moving closer to a target or zooming in with a camera sensor) may change the image received by camera sensor 160. In the example, as a result of performing the first task based on the chain of redirected and interpreted commands originating from command 180 from endpoint control service 110, camera sensor 160 begins to receive a fresh data feed different from the data feed in sensor output 170 (e.g., a closer view of the target is now collected). In an example, the fresh data feed is also redirected to the virtual endpoint service 140. In an example, the fresh data feed completes a feedback loop for endpoint control service 110, by presenting endpoint control service 110 with a result of command 180. In an example, by performing the first task, endpoint device 145 produces a physical change to the endpoint device 145 (e.g., focusing a lens or changing a propeller speed) and/or the local environment surrounding the endpoint device 145 (e.g., thrust from a higher propeller speed or shining a light for a better image capture). In an example, a plurality of sensors on endpoint device 145 may simultaneously redirect their output data to virtualized endpoint service 140, and a plurality of commands may be issued by endpoint control service 110 based on the redirected data. For example, data feeds may simultaneously be redirected for a camera, an altimeter, and a GPS system. In the example, broad navigation commands may be issued based on the GPS system, while zoom and focus commands may be issued to the camera. The altimeter feed may be monitored as a safety mechanism to alert if altitude drops below a certain threshold.

Figure 4A:
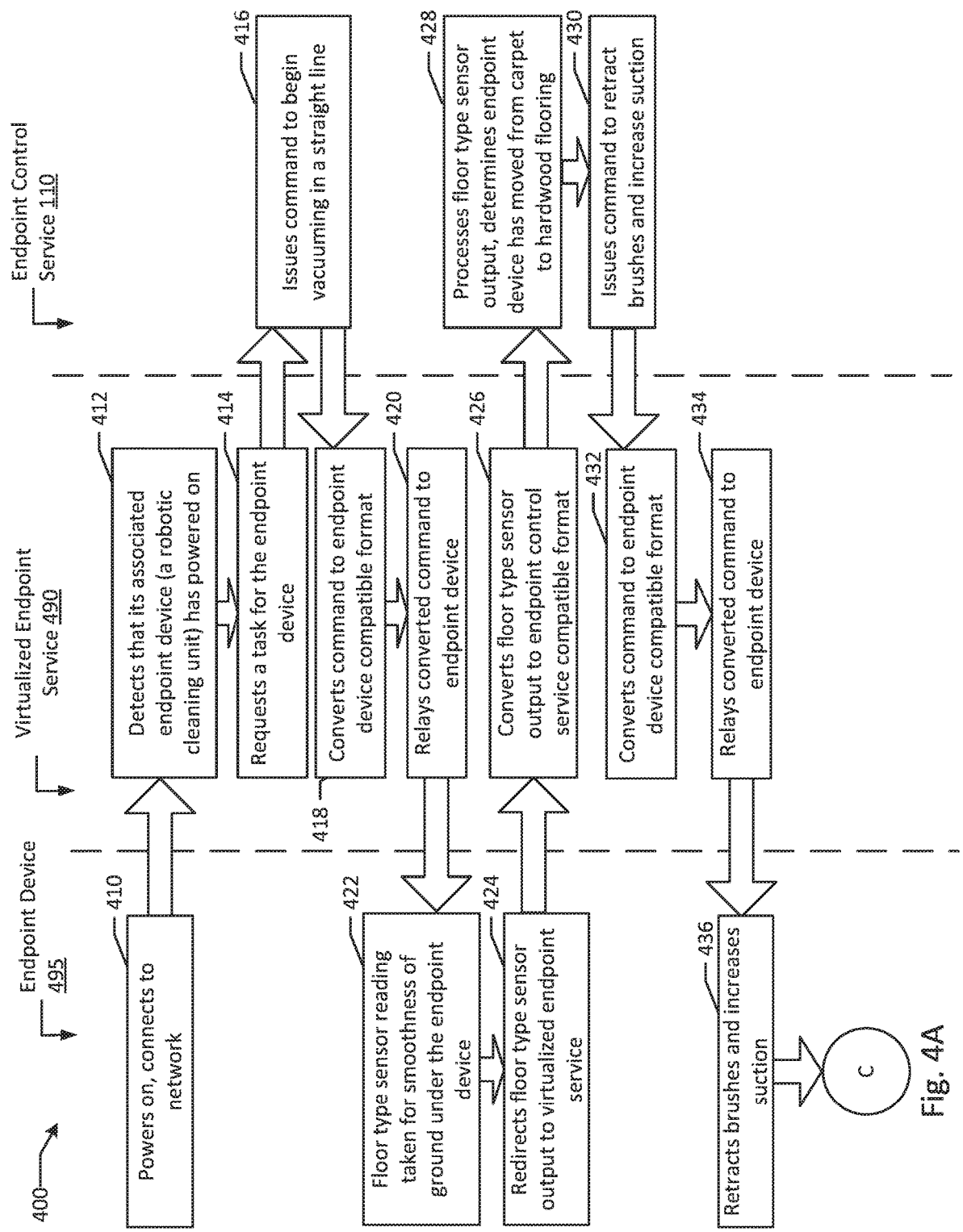
FIGS. 4A and 4B are flow diagrams illustrating an intelligently assisted IoT endpoint device process according to an example of the present disclosure.
Figure 4B:
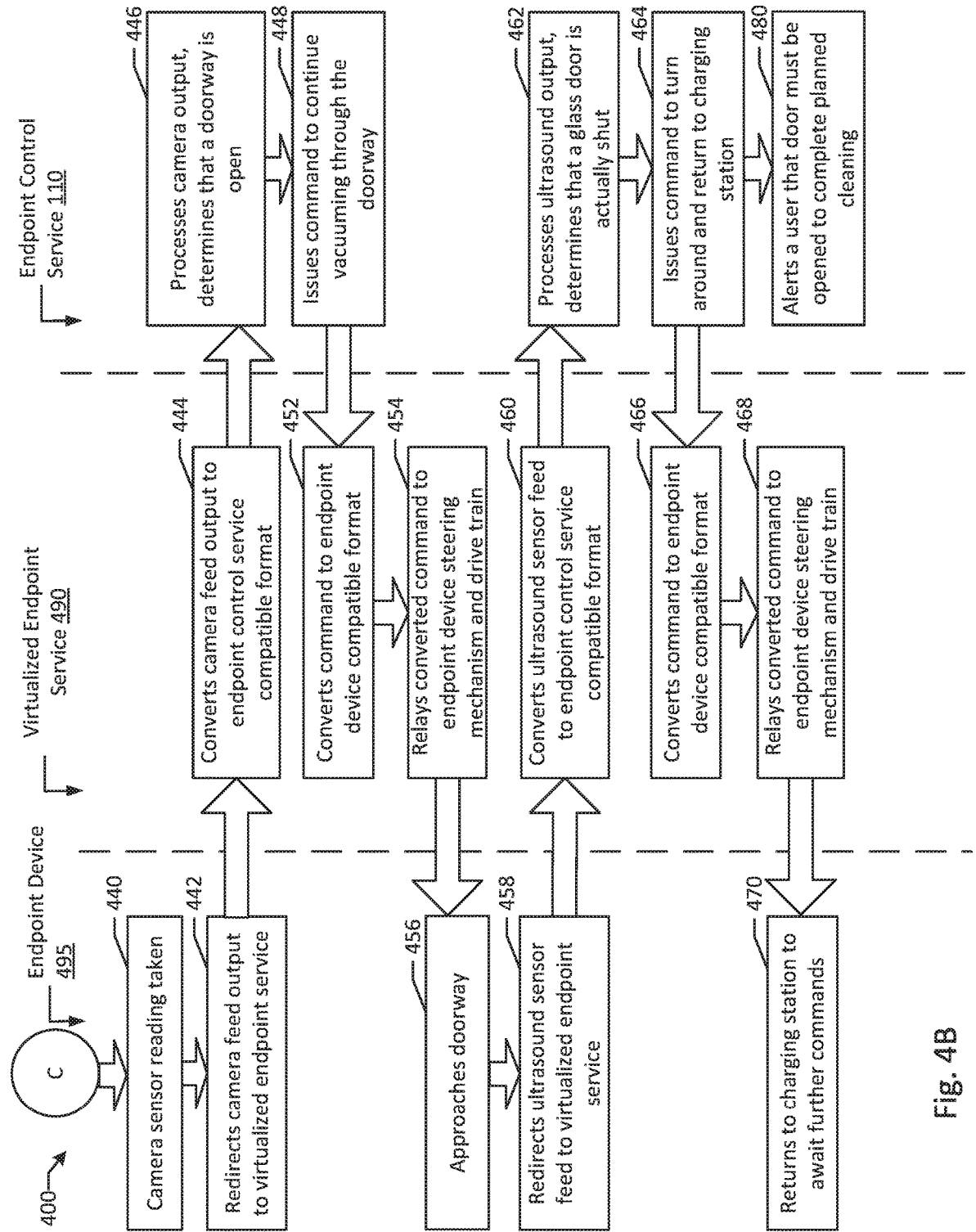

FIGS. 4A and 4B are flow diagrams illustrating an intelligently assisted IoT endpoint device process according to an example of the present disclosure. Although the examples below are described with reference to the flowchart illustrated in FIGS. 4A and 4B, it will be appreciated that many other methods of performing the acts associated with FIGS. 4A and 4B may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 400, a virtualized endpoint service 490 and an endpoint control service 110 provide intelligent assistance for IoT endpoint device 495.

Endpoint device 495 may power on and connect to network 115 (block 410). In an example, endpoint device 495 may be pre-configured during manufacturing to be coupled with a virtualized endpoint service 490. In another example, endpoint device 495 may be functional without a network connection to virtualized endpoint service 490, but may rely on an association to virtualized endpoint service 490 for at least part of its features (e.g., some features may be unavailable without a network connection). In an example, virtualized endpoint service 490 may detect that its associated endpoint device 495, in this case a robotic cleaning unit, has powered on (block 412). In an example, virtualized endpoint service 490 may detect that endpoint device 495 has powered on based on a transmission from endpoint device 495 (e.g., a request to start a communication session). In another example, endpoint device 495 may begin attempting to forward sensor data to virtualized endpoint service 490 as soon as it powers on.

In an example, virtualized endpoint service 490 may request endpoint control service 110 to provide a task for endpoint device 495 to carry out (block 414). In various examples, the request for an initial task may or may not include any forwarded sensor data. In response to the request, endpoint control service 110 may issue a command for endpoint device 495 to begin vacuuming in a straight line (block 416). In an example, the command from endpoint control service 110 may be generic, and may rely on components of virtualized endpoint service 490 (e.g., virtual interactive element controllers) to be interpreted. In an example, virtualized endpoint service 490 converts the command to a format compatible with endpoint device 495 (block 418). In other examples, endpoint control service 110 may issue a command that is ready to be implemented by an interactive element with components of virtualized endpoint service 490 primarily providing routing for the command. In an example, an interactive element may be wheels, tracks, or the drive train of endpoint device 495. In various examples, regardless of how much conversion of the command is necessary, virtualized endpoint service 490 may relay the converted command to endpoint device 495 (block 420). In most examples, virtualized endpoint service 490 will at a minimum package the command into a network transmission protocol compatible with endpoint device 495.

In an example, endpoint device 495 may be equipped with a floor type sensor. For example, the floor type sensor may detect a smoothness value of the floor under endpoint device 495. In an example, upon connecting to virtualized endpoint service 490, the sensor data from floor type sensor has been forwarded to virtualized endpoint service 490, and redirected to endpoint control service 110. In an example, the floor type sensor is continually taken for the smoothness of the ground under the endpoint device (block 422). In an example, endpoint device 495 does minimal processing to the sensor readings (e.g., only packaging the readings for network transmission). In the example, the floor type sensor output is redirected to virtualized endpoint service 490 (block 424). For example, due to the minimal processing taking place, the only latency observed is the network latency for the transmissions. In an example, due to leveraging a global multi-tenant cloud environment to host virtualized endpoint service 490 and endpoint control service 110, endpoint device 495 may be physically close enough to virtualized endpoint service 490 and endpoint control service 110 for latency to be under 20 ms. In an example, virtualized endpoint service 490 may convert the floor type sensor output to a format compatible with endpoint control service 110 (block 426). In the example, virtualized endpoint service 490 may include a driver (e.g., a virtual sensor associated with the floor type sensor) specifically configured to process the output of the specific type of floor type sensor equipped in endpoint device 495. In the example, the virtual sensor may convert raw data into a generically scaled reading.

The endpoint control service 110 may process the floor type sensor's output, and determine that endpoint device 495 has moved from carpet to hardwood flooring (block 428). In an example, floor type sensor output may include various compression and/or resistance data. In an example, based on the processed sensor output, endpoint control service 110 issues a command to retract brushes and increase suction on endpoint device 495 (block 430). In the example, brushes may potentially, for example, damage the finish on hardwood flooring, but extra suction may be needed to clean satisfactorily without brushing. In an example, high suction on carpet may be strong enough to slow down or stop the mobility of the endpoint device 495 as fibers clog the intake. In an example, endpoint device 495 may also report data on the amount of suction currently being used as well as the relative amount of power currently required for mobility, which may be additional factors considered by endpoint control service 110 to determine floor type and proper suction levels. In an example, virtualized endpoint service 490 converts the command into an endpoint device compatible format (block 432). In the example, the command may be routed to two or more virtual interactive element controllers, for example, one for controlling suction and one for controlling an actuator that raises and lowers brushes. In an example, the various virtual interactive element controllers may be drivers configured to interface with the specific versions of interactive elements equipped on endpoint device 495 (e.g., the type of brush and suction component on endpoint device 495). The various virtual interactive element controllers may then package the converted commands for network transmission. The packaged converted commands may then be relayed to endpoint device 495 (block 434). Based on receiving the commands, endpoint device 495 (specifically interactive elements for brush height and suction power) may retract brushes and increase suction (block 436). A roundtrip latency from the time sensor output is redirected to virtualized endpoint service 490 to endpoint device 495 retracting brushes and increasing suction may be in the order of 20 ms to 100 ms while network 115 operates under optimal to normal conditions.

In an example, endpoint device 495 has an additional camera sensor, which takes a sensor reading (block 440). In the example, the camera feed output is redirected to virtualized endpoint service 490 (block 442). Virtualized endpoint service 490 converts the camera feed output to an endpoint control service 110 compatible format (block 444). In an example, the data feed from the camera sensor may be raw image files, which virtualized endpoint service 490 (specifically a virtual sensor in virtualized endpoint service 490) may convert to a standard video file format for endpoint control service 110. In an example, endpoint control service 110 may process the camera output and determine that a doorway is open (block 446). In the example, the endpoint control service 110 may issue a command for endpoint device 495 to continue vacuuming through the doorway (block 448). Virtualized endpoint service 490 may then convert the command to an endpoint device 495 compatible format (block 452). For example, an virtual interactive element controller in virtualized endpoint service 490 may be associated with an interactive element on endpoint device 495 that controls steering. Virtualized endpoint service 490 may then relay the converted command to a steering component and drive train of endpoint device 495 (block 454). In the example, the steering component and drive train may be two or more interactive elements of endpoint device 495, associated with virtualized interactive element controllers in virtualized endpoint service 490. As a result of the commands, endpoint device 495 may approach the doorway (block 456).

In an example, endpoint device 495 may be equipped with an ultrasound based collision detection sensor (e.g., a sonar device). Endpoint device 495 may redirect the ultrasound sensor feed to virtualized endpoint service 490 (block 458). In an example, the ultrasound sensor feed may be a safety feature, and endpoint device 495, while relying on endpoint control service 110 for detailed processing of the ultrasound sensor feed, may be configured to immediately come to a stop if a collision is detected to be imminent (e.g., the ultrasound signal's echo is received in under a certain critical threshold of time). In an example, certain safety features may include backup components for temporary actions before commands may typically return from a virtualized endpoint service. The virtualized endpoint service 490, upon receiving the redirected ultrasound sensor feed, may convert the ultrasound sensor feed to an endpoint control service 110 compatible format (block 460). In an example, endpoint control service 110 may then process the ultrasound output to determine that a glass door is actually shut in the doorway (block 462). In an example, endpoint control service 110 may issue a command for endpoint device 495 to turn around and return to its charging station (block 464). Virtualized endpoint service 490 may convert the command to an endpoint device 495 compatible format (block 466). In an example, the command may include several component parts instructing different interactive elements to different tasks. For example, virtual interactive element controllers for steering and drive train components may be required to move the endpoint device 495 to its charging station. In addition, various location sensing sensor feeds may need to be processed by virtualized endpoint service 490 and endpoint control service 110 to direct the endpoint device 495 to its charging station. In an example, virtualized endpoint service 490 may relay the converted commands to endpoint device 495, specifically to steering and drive train components (block 468). In an example, endpoint device 495 may return to its charging station to await further commands (block 470). In an example, endpoint device 495 may enter a standby mode while maintaining an active network connection with virtualized endpoint service 490. In an example, endpoint control service 110 may further alert a user that the door must be opened to complete a planned cleaning cycle (block 480). This alert may be in the form of an intercom in the building, a message (e.g., SMS or voicemail) over a cellular network, an electronic mail or any other suitable form of alert. In an example, upon confirmation that the door has been opened, endpoint control service 110 reissues a command to endpoint device 495 to clean past the doorway.

In an example, all of the various sensors on endpoint device 495 may report simultaneously. For example, brush height and vacuum strength may continually be adjusted as endpoint device 495 moves back and forth between different surfaces. In addition, collision detection based on the ultrasound sensor may be constantly performed. In an example, battery life and dust bin capacity sensors are continually monitored for indications that endpoint device 495 should return to its charging station for a battery recharge or replacement, or a dust bin emptying or replacement.

Figure 5:
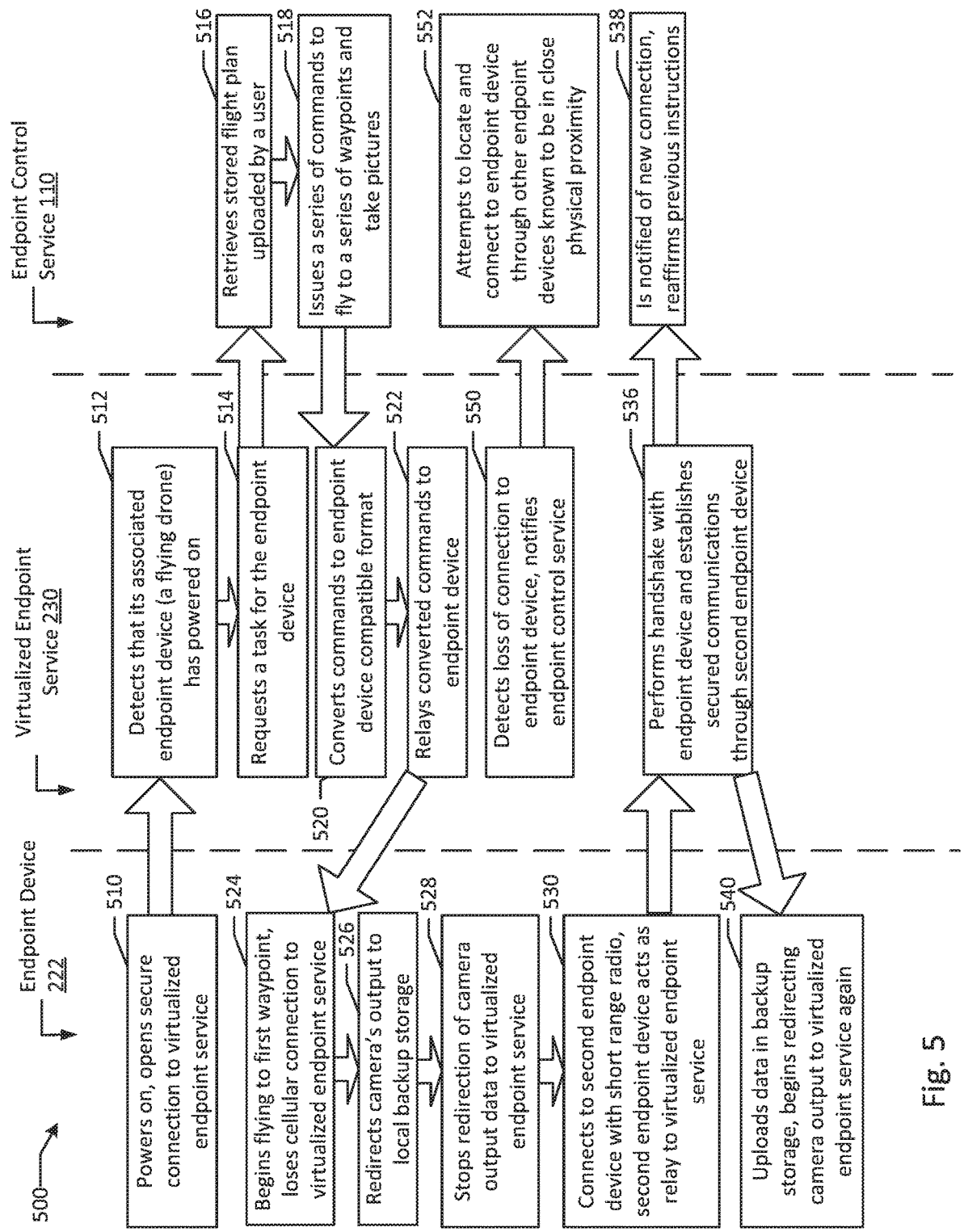
FIG. 5 is a flow diagram illustrating connectivity redundancy for intelligently assisted IoT endpoint devices according to an example of the present disclosure.

FIG. 5 is a flow diagram illustrating connectivity redundancy for intelligently assisted IoT endpoint devices according to an example of the present disclosure. Although the examples below are described with reference to the flowchart illustrated in FIG. 5, it will be appreciated that many other methods of performing the acts associated with FIG. 5 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In example system 500, a virtualized endpoint service 230 and an endpoint control service 110 provide intelligent assistance for IoT endpoint device 222 that loses network connectivity.

An example endpoint device 222 may be a camera equipped flying drone. In an example, endpoint device 222 may power on and open a secure connection to virtualized endpoint service 230 (block 510). In an example, the secure connection may be an encrypted and/or obfuscated network communication session. Virtualized endpoint service 230 may detect that its associated endpoint device 222 has powered on (block 512). In response to detecting that endpoint device 222 has powered on, virtualized endpoint service 230 may request a task for endpoint device 222 from endpoint control service 110 (block 514). In an example, endpoint control service 110 may retrieve a stored flight plan uploaded by a user (block 516). An example flight plan may be to provide images of commercial assets spread over a large distance, such as a pipeline, a railway, or a roadway, along with waypoints indicating locations of emphasis. Another example may be a surveillance route around the perimeter of an amusement park, an industrial park, or a storage yard. Endpoint control service 110 issues a series of commands to virtualized endpoint service 230 to have endpoint device 222 fly to a series of waypoints and take pictures (block 518). In an example endpoint control service 110 continually monitors sensor data from endpoint device 222 throughout the execution of the flight plan and issues adjustments as necessary, such as course corrections or responses to environmental stimuli (e.g., turbulence or weather). In an example, virtualized endpoint service 230 may convert the commands to an endpoint device 222 compatible format (block 520). In the example, virtualized endpoint service 230 then relays the converted commands to the endpoint device 222 (block 522).

In an example, endpoint device 222 powers on while it is within wireless signal range 215 of wireless access point 217. In the example, as endpoint device 222 begins flying to its first waypoint, it leaves wireless signal range 215, and loses its cellular connection to virtualized endpoint service 230 (block 524). In an example, virtualized endpoint service 230 may notify endpoint control service that it has lost its connection to endpoint device 222 (block 550). In the example, virtualized endpoint service 230 may deduce that it has lost connection to endpoint device 222 based on a stoppage of sensor data redirection from endpoint device 222. In another example, virtualized endpoint service 230 may detect a lack of a response from endpoint device 222 to a message for maintaining the security of its secured connection to endpoint device 222 (e.g., a lack of response to an authentication or encryption key request). In an example, endpoint control service 110 may attempt to locate and connect to endpoint device 222 through other endpoint devices known to be in close physical proximity to endpoint device 222 (block 552).

In an example, upon losing connectivity with virtualized endpoint service 230, endpoint device 222 may be configured to redirect the camera sensor's output to local backup storage (block 526). In an example, an endpoint processor on endpoint device 222 may determine that endpoint device 222 lacks an active network connection due to it's communication session with virtualized endpoint service 230 being disconnected. In another example, the endpoint processor may determine that it is experiencing unacceptably high latency or packet loss rates. In an example, the endpoint processor may determine that endpoint device 222 has unacceptably low wireless signal strength (e.g., cellular signal strength). As a result, endpoint device 222 may stop redirection of the camera output data to the virtualized endpoint service 230 (block 528). In some examples, raw data may be stored in local backups. In other examples, converted, and possibly compressed data may be stored in local backups. Where security concerns are paramount, encryption of local storage may be enabled, or local backups may instead not be recorded at all. In some examples, endpoint device 222 may be equipped with emergency programming in case of a loss of network connectivity. For example, endpoint device 222 may include capabilities to continue towards a previous waypoint, to maintain hovering, or to return to its origin in the event of a loss of network connectivity. In the example, endpoint device 222 after stopping redirection of I/O data, may process data from a GPS sensor to determine a current position of endpoint device 222, and may navigate towards GPS coordinates of the first waypoint in the flight plan. In an example, an endpoint processor processing the GPS coordinates may determine that endpoint device 222 may need to turn to the left to reach its destination. To achieve the course correction, endpoint device 222 may be instructed to increase rotational speed of a propeller on the right side thereby turning the drone left. In an example, endpoint device 222 may be unaware and may lack the processing capabilities and data to be aware that endpoint controller service 110's original course was plotted to avoid requiring endpoint device 222 having to traverse a mountain between its current position and its first waypoint. In an example, the new route planned by endpoint device 222 may require significantly more power expenditure. In certain examples, endpoint device 222 may be equipped with a safety mode activated upon the stoppage of I/O data redirection. In an example, upon entering safety mode, endpoint device 222 may be configured to prevent or mitigate physical damage to the first endpoint device (e.g., maintain hovering in place, and/or slowly scale back propeller rotation speed to achieve a soft landing).

In an example, before or after losing connectivity with the network 115 over a cellular connection enabled by wireless access point 217, endpoint device 222 may attempt to locate and establish a connection with other endpoint devices within short range wireless communication range of endpoint device 222. For example, endpoint device 222 may attempt to locate other endpoint devices within WiFi range. In an example, endpoint device 222 may establish a connection to endpoint device 126, which is also not within any wireless signal range (e.g., wireless signal ranges 210 and 215), but endpoint device 126 may further be connected to endpoint devices 122 and 220 over another WiFi connection. In an example, endpoint device 126 is connected to network 115 using endpoint devices 122 and 220 as relay points. In an example endpoint device 222 may connect to endpoint device 126 through a short range WiFi radio, and endpoint device 126 may act as a relay for transmissions between endpoint device 222 and virtualized endpoint service 230 (block 530). In an example, endpoint device 222 may have discovered endpoint device 126 prior to losing endpoint device 222's direct network connection, and may connect to endpoint device 126 responsive to losing the direct network connection. In an example, endpoint device 222 may continue attempting to discover more relays. For example, endpoint device 222 may eventually move out of range of endpoint device 126. In another example, endpoint device 222 may experience unacceptable latency or packet loss with only one connection path to network 115, especially where the connection path includes multiple relays.

In an example, virtualized endpoint service 230 may request endpoint device 222 to perform a handshake again to authenticate endpoint device 222 and to establish a secured communication channel through endpoint device 126 acting as a relay (block 536). In an example, endpoint device 126 may act as a passive conduit for messages between virtualized endpoint service 230 and endpoint device 222. In another example, endpoint device 126 may be included in the authentication and handshake process. In an example, upon establishment of the new connection relayed by endpoint device 126 between virtualized endpoint service 230 and endpoint device 222, endpoint control service 110 is notified of the new connection and may reaffirm the previous instructions to endpoint device 222 (block 538). In an example, endpoint control service 110 awaits continued I/O data redirection and reassesses the new I/O data from endpoint device 222's onboard sensors prior to issuing any new instructions. In an example, upon establishing a new connection to virtualized endpoint service 230, endpoint device 222 uploads any I/O data stored in its onboard backup storage and begins redirecting I/O data including camera output to virtualized endpoint service 230 again (block 540). In an example, endpoint device 222 may delete any backup data upon confirmation of transmission to virtualized endpoint service 230. In an example, messages directed to endpoint device 222 may be distinguished from messages directed to endpoint device 126 based on message headers.

In an example, an endpoint device acting as a relay need not be an endpoint device of the same type as the endpoint device that lost connection. Returning to the robotic cleaning endpoint device, the robotic cleaning unit may lose connectivity by entering an elevator. In an example, the elevator may also be an intelligently assisted IoT endpoint device, allowing the robotic cleaning unit to re-establish its connection to its virtualized endpoint service while inside using the elevator as a relay.

In various examples of intelligently assisted IoT endpoint devices, advantages other than those related to higher processing capacity based on the scalability of endpoint control service 110 may be observed. For example, because the primary operational and control software for an endpoint device (e.g. endpoint device 145) are moved from onboard the endpoint device 145 into virtualized endpoint service 140, many software updates for drivers and other controls (e.g., virtual sensors 161 and 163 and virtual interactive element controllers 166 and 168) may be performed server side rather than requiring an update of the endpoint device 145. In an example, without requiring updates directly on an endpoint device, updates including security patches may be rolled out much more quickly and with lower negative impact due to unintended consequences of the updates. For example, a failed update on a device may result in a non-operational device that requires service by a maintenance technician, while a failed update to a virtual machine hosting a virtualized endpoint service may simply require restoring a backup of the virtual machine. In addition, by isolating task specific processing software away from physical storage on an endpoint device, the likelihood of tampering on that software is much reduced, both through avoiding direct manipulation to the programming of the endpoint device from a malicious actor who gains access to the device and through avoiding the malicious actor gaining access to the software code to reverse engineer vulnerabilities.

In an example, endpoint devices may inhabit a wide variety of form factors. From a light bulb or heating unit with intelligence to turn on in response to an owner driving in the general direction towards home, to a driverless car or package delivering drone. Varying degrees of onboard processing capability may all benefit from intelligent assistance, especially from an endpoint control service being capable of integrating sensors and interactive elements from a plurality of endpoint devices to achieve a goal that may not be achievable through the endpoint device acting on its own. In various examples, the types of I/O data redirected for network processing may also depend on application. For example, emergency braking systems for a driverless car may be processed and activated on the endpoint device itself because momentary latency or loss of connectivity could have disastrous consequences. However, the same sensors used in the emergency braking system may redirect a copy of their data feeds to a virtualized endpoint service as inputs for commands to a virtualized interactive element controller for a steering system interactive element.

Intelligently assisted IoT endpoint devices may leverage the computing power of cloud computing to reduce power and processing requirements in a variety of applications. In many typical endpoint devices, batteries may represent a disproportional percentage of the weight of the endpoint device. Therefore, by reducing processor power requirements, battery size may be reduced, reducing the weight of the endpoint device, and increasing the effective range of the device due to less of a burden on the endpoint device's propulsion systems. Similarly, more powerful actuators may be installed in the endpoint device if power requirements from the computational side of the endpoint device are reduced. Added benefits to data security and ease of update may dramatically cut down on deployment costs for automated solutions with intelligently assisted IoT endpoint devices.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
an endpoint device connected to a network, wherein the endpoint device includes a physical sensor and the endpoint device includes an interactive element;
a first endpoint processor executing on the endpoint device to:
determine that the endpoint device has an active network connection;
responsive to determining that the endpoint device has an active network connection, redirect input/output data from the physical sensor to a first network interface;
one or more processors, wherein the one or more processors are located over the network from the endpoint device;
a first virtualized endpoint service associated with the endpoint device executing on the one or more processors including:
a virtual sensor associated with the first physical sensor;
a first virtual interactive element controller associated with a first interactive element;
a first virtualized endpoint engine;
a virtualized endpoint service executing to:
receive, over the network by the first virtual sensor, first redirected data collected by the physical sensor, wherein the first redirected data is part of the input/output data redirected by the endpoint device;
output, by the virtual sensor, the first redirected data to the virtualized endpoint engine;
convert, by the virtualized endpoint engine, the first redirected data into a first converted data compatible with an endpoint control service;
send, by the virtualized endpoint engine, the first converted data to the endpoint control service;
receive, by the virtualized endpoint engine, from the endpoint control service, a first command;
send, by the virtualized endpoint engine, the first command to the first virtual interactive element controller;
convert, by the virtual interactive element controller, the first command into a second command compatible with the first interactive element;
send the second command, over the network, causing the first interactive element to perform a first task that results in a change in the endpoint device or an endpoint device's sensor or a local environment surrounding the endpoint device; and
receive, over the network by the first virtual sensor, second redirected data collected by the physical sensor, wherein the second redirected data is different from the first redirected data as a result of performing the first task.

2. The system of claim 1, wherein the first interactive element includes at least one of a propeller, a wheel, a tread track, a motor, a jet, a magnetic levitation system, a gyroscope stabilizer, a braking system, or a steering system.

3. The system of claim 1 wherein the first interactive element controls at least one physical sensor and the first task changes at least one of an orientation, a focus, and a mode of the first physical sensor.

4. The system of claim 1, wherein the second redirected data is an updated version of the first redirected data.

5. The system of claim 1, wherein the physical sensor is chosen from the group comprising of a camera, a microphone, an accelerometer, an antenna, a battery life sensor, a compass, a Global Positioning System sensor, a gyroscope, and a radio.

6. The system of claim 1, wherein the endpoint device and a second endpoint device are connected to the network via wired or wireless connection.

7. The system of claim 6, wherein the endpoint device is connected to the network via a first connection to the second endpoint device, and the second endpoint device relays information between the first connection and the network.

8. A system comprising:
one or more endpoint devices connected to a network, where each endpoint device includes one or more physical sensors assigned to one or more interactive element(s);
one or more endpoint processor(s) executing on one or more endpoint device(s) to: determine that one or more endpoint device(s) has an active network connection; responsive to determining that one or more endpoint device(s) has an active network connection, redirect input/output data from the included physical sensor(s) to one or more network interfaces;
one or more processors, wherein the one or more processors are located over the network from the one or more endpoint devices;
one or more virtualized endpoint service(s) associated with one or more endpoint device(s) executing on the one or more processors including: a virtual sensor service respectively associated with one or more physical sensor(s) of the one or more endpoint device(s);
one or more virtual interactive element controller(s) respectively associated with one or more interactive element(s) associated with the one or more endpoint device(s); one or more virtualized endpoint engine(s);
one or more virtualized endpoint service(s) executing to:
receive, over the network by the one or more virtual sensor(s), redirected data collected by one or more physical sensor(s), wherein the first redirected data is part of the input/output data redirected by one or more endpoint device(s); output, by one or more virtual sensor(s), the redirected data(s) to one or more virtualized endpoint engine(s);
convert, by one or more virtualized endpoint engine(s), the redirected data into converted data(s) compatible with one or more endpoint control service(s);
send, by one or more virtualized endpoint engine(s), the converted data to one or more endpoint control service (s);
receive, by one or more virtualized endpoint engine(s), from one or more endpoint control service(s) a first command;
send, by the one or more virtualized endpoint engines, the first command to the first virtual interactive element controller;
convert, by the one or more virtual interactive element controllers, the first command into a second command compatible with the first interactive element;
send the second command, over the network, causing the first interactive element to the virtualized engine to perform a task that results in a change in one or more of the endpoint devices or one or more of an endpoint device's sensors or a local environment surrounding one or more of endpoint devices; and
receive, over the network by the first virtual sensor, second redirected data collected by one or more physical sensors, wherein the second redirected data is different from the first redirected data as a result of performing the first task.

9. The system of claim 8, wherein the first virtualized endpoint service is exclusively associated with one endpoint device of the plurality of endpoint devices.

10. The system of claim 8, wherein the first virtualized endpoint service executes in an isolated guest in a cloud environment.

11. The system of claim 10, wherein the cloud environment is one of a public cloud environment and a private cloud environment.

12. The system of claim 10, wherein the isolated guest is one of a virtual machine and a container.

13. The system of claim 10, wherein the endpoint control service executes on a plurality of isolated guests.

14. The system of claim 10, wherein a quantity of isolated guests in the plurality of isolated guests scales based on the computing requirements for interpreting a plurality of converted data from a plurality of virtualized endpoint services and an issuing of a plurality of commands.

15. A method comprising:
determining that an endpoint device has an active network connection;
responsive to determining that the endpoint device has an active network connection, redirecting input/output data from one or more sensors of the endpoint device including a first physical sensor to a network interface;
receiving, over a network by a first virtual sensor of a virtualized endpoint service associated with the first physical sensor, first redirected data collected by the first physical sensor, wherein the first redirected data is part of the input/output data redirected by the first endpoint device;
outputting, by the first virtual sensor, the first redirected data to a first virtualized endpoint engine;
converting, by the virtualized endpoint engine, the first redirected data into a first converted data compatible with an endpoint control service;
sending, by the virtualized endpoint engine, the first converted data to the endpoint control service;
receiving, by the virtualized endpoint engine from the endpoint control service, a first command;
sending, by the virtualized endpoint engine, the first command to a first virtual interactive element controller associated with a first interactive element of the endpoint device;
converting, by the virtual interactive element controller, the first command into a second command compatible with the first interactive element;
sending the second command, over the network, causing the first interactive element to perform a first task that results in a change in one of the first endpoint devices or endpoint device's sensor or a local environment surrounding the first endpoint device; and
receive, over the network by the first virtual sensor, second redirected data collected by the first physical sensor, wherein the second redirected data is different from the first redirected data as a result of performing the first task.

16. The method as claimed in claim 15 further comprising the step of communicating between the first virtualized endpoint service and the first endpoint device by encryption and obfuscation.

17. The method as claimed in claim 15 further comprising an first endpoint device chosen from the group comprising a robotic vehicle, a drone, and a robotic device.

18. The method as claimed in claim 15 further comprising the step of the first endpoint device forwarding sensor data from the first physical sensor and the second physical sensor to the first virtualized endpoint service for storage.

19. The method as claimed in claim 15 further comprising the step of the first virtualized endpoint service communicatively coupled with an interface for a user to control the first endpoint device.

20. The method as claimed in claim 15 further comprising the step controlling the first endpoint device in response to a loss of network connectivity.

* * * * *